W. B. BENNETT.
Vehicle-Spring.

No. 226,593. Patented April 20, 1880.

WITNESSES:
Charles M. Roberts
Gustavus White

INVENTOR
William B. Bennett
Levis & Bickel ATTORNEYS

UNITED STATES PATENT OFFICE.

WILLIAM B. BENNETT, OF VERONA, PENNSYLVANIA.

VEHICLE-SPRING.

SPECIFICATION forming part of Letters Patent No. 226,593, dated April 20, 1880.

Application filed October 13, 1879.

*To all whom it may concern:*

Be it known that I, WILLIAM B. BENNETT, of Verona, Allegheny county, Pennsylvania, have invented certain new and useful Improvements in Carriage or other Vehicle Springs, of which the following is a description, reference being had to the accompanying drawings, forming a part of this specification, in which—

Figure 1:
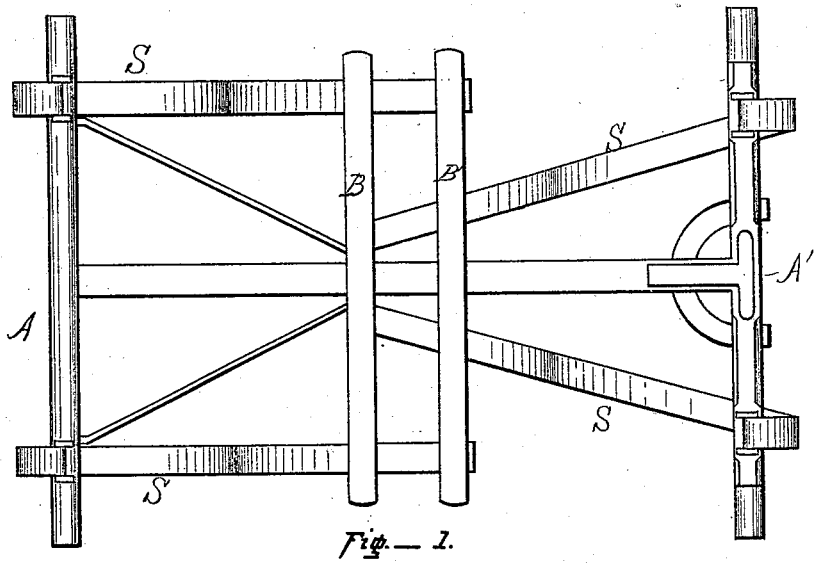
Figure 2:
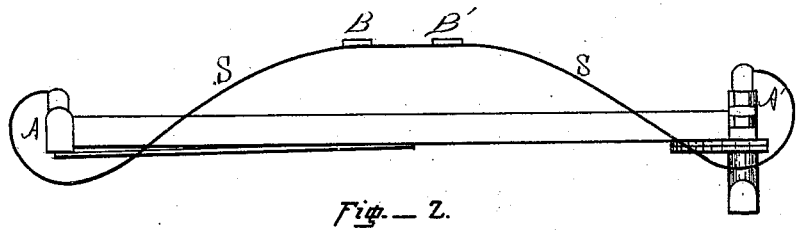
Figure 3:
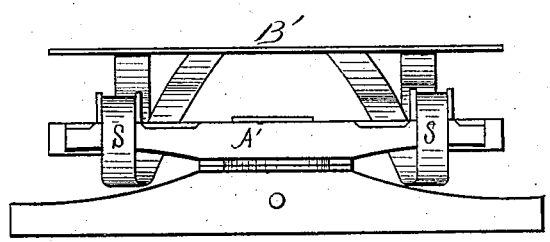

Figure 1 represents a plan view of my spring. Fig. 2 represents an edge view. Fig. 3 represents a front elevation.

This invention relates to vehicle-springs; and it consists in making springs attached to the upper side of the axle pass under it rearward and frontward and rise again between the two axles and form or be attached to the body-support.

In the drawings, A A' are the axles. S S are the springs. They are fastened to the upper side of the axle in any suitable manner, and curving around the axles rearward and forward pass under them and rise above their plane, meeting in the center, where they are attached to the body-supports or cross-bars B B', as shown in the drawings.

The cross-bars B B' extend from side to side of the springs, and while they form the attachments for these they at the same time afford a means of support for the body or bed of the vehicle. Any number of springs formed in this way may be used without impairing the beauty or utility of a vehicle.

The formation of this spring renders it very delicate in its elasticity, and hence peculiarly adapted to light vehicles.

I am aware that springs have been made somewhat similar to mine formed of one piece, having one end attached to one axle and describing the same shape as mine, attached at the other end to the other axle; and I do not claim such, for in the single piece there is not the chance to adapt the shape and direction of the springs so as to form the center bearing as in a spring formed of two pieces, as mine; but What I do claim is—

The herein-described improvement in vehicle-springs, consisting of the spring formed of four pieces, arranged in two sets, the hinder ones being attached to the upper face of the rear axle, and curving round and under it, rising above the plane of attachment and running parallel to each other, and the front set being attached to the upper face of the front axle or bolster, curving round and under it, rising to a plane with the rear set and converging as they rise, in combination with the cross-bars B B' and axles A A', substantially as set forth.

WILLIAM B. BENNETT.

Witnesses:
O. D. LEVIS,
W. G. CARROLL.